United States Patent [19]

Buist et al.

[11] Patent Number: 5,030,103
[45] Date of Patent: Jul. 9, 1991

[54] DYNAMIC MOLECULAR MODEL

[76] Inventors: Peter H. Buist, 124 Fieldgate Dr., Nepean, Ontario, K2J 1T9; Alois A. Raffler, 20 Whitewood Ave., Manotick, Ontario both of Canada, K0A 2N0

[21] Appl. No.: 477,621

[22] Filed: Feb. 9, 1990

[51] Int. Cl.[5] ............................................. G09B 23/26
[52] U.S. Cl. .................................. 434/278; 434/281; 446/126
[58] Field of Search ................ 434/276, 277, 278–279, 434/281; 273/109, 153 S; 446/116, 126

[56] References Cited

U.S. PATENT DOCUMENTS

| | | | |
|---|---|---|---|
| 1,851,159 | 3/1932 | Dodge | 434/278 |
| 3,080,662 | 3/1963 | Brumlik | 434/278 |
| 3,333,349 | 8/1967 | Brumlik | 434/278 |
| 3,458,949 | 8/1969 | Young | 434/278 X |
| 3,510,962 | 5/1970 | Sato | 434/278 |
| 4,030,209 | 6/1977 | Dreiding | 434/278 |
| 4,378,218 | 3/1983 | Fletterick et al. | 434/279 |
| 4,398,888 | 8/1983 | Darling et al. | 434/278 |
| 4,877,406 | 10/1989 | Wilk | 434/278 |

FOREIGN PATENT DOCUMENTS

| | | | |
|---|---|---|---|
| 712758 | 7/1965 | Canada | 35/13 |
| 871230 | 5/1971 | Canada | 35/13 |
| 907320 | 8/1972 | Canada | 35/13 |
| 949311 | 6/1974 | Canada | 35/4 |
| 1147143 | 5/1983 | Canada | 35/26 |
| 1167637 | 5/1984 | Canada | 35/26 |
| 1179497 | 12/1984 | Canada | 35/26 |

Primary Examiner—Richard J. Apley
Assistant Examiner—Rachel M. Healey
Attorney, Agent, or Firm—Eckert Seamans Cherin & Mellott

[57] ABSTRACT

A novel molecular model assembly is provided herein for representing the structure of a molecule. That assembly includes a three dimensional body providing a physical representation of an atomic core, and a first cylindrical hole extending inwardly along a central longitudinal axis of such three dimensional body from each end of such three dimensional body. A plurality of connecting guiding elements, e.g. arcuate lobes project from such three dimensional body or a plurality of arcuate slots are inset into such three dimensional body, each being disposed equiangularly about the periphery of such three dimensional body core. An arm projects outwardly from a face of each such connecting guiding element, such arm being connected to an associated such connecting guiding element by a suitable mechanism so as to be arcuately movable only along a single predetermined plane relative to its associated connecting guiding element, elements inwardly along the central longitudinal axis of each of such arms from the distal end thereof. A plurality of axial conenctors is adapted to be inserted into selected ones of the first cylindrical holes and a plurality of equatorial connectors is adapted to be inserted into selected ones of the second cylindrical holes. This molecular model assembly provides a molecular model which can be used to demonstrate various torsional and configurational changes which commonly occur during chemical transformations. Thus, one can realistically simulate actual chemical processes using a "hands-on" model.

40 Claims, 36 Drawing Sheets

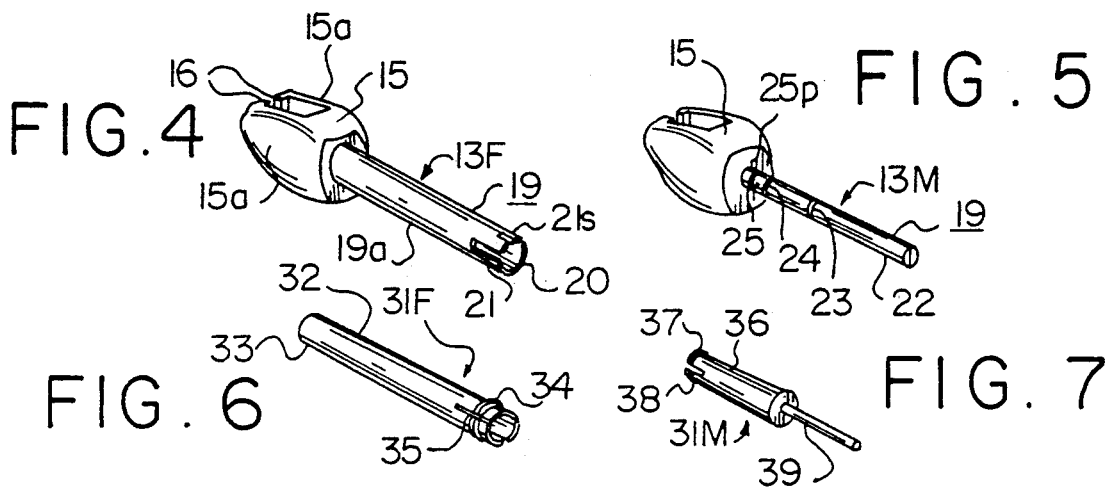
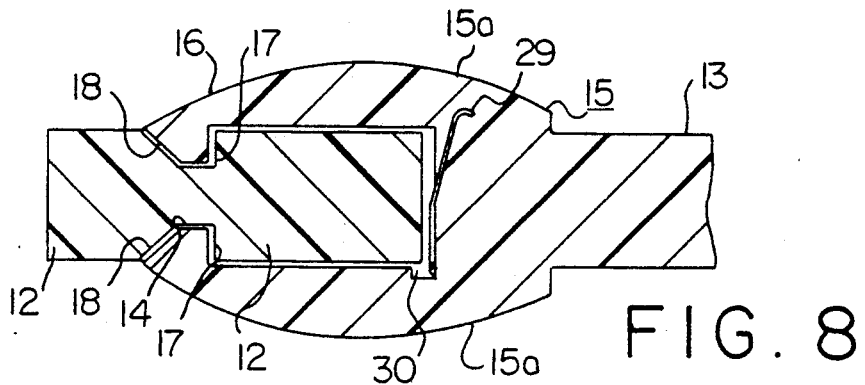
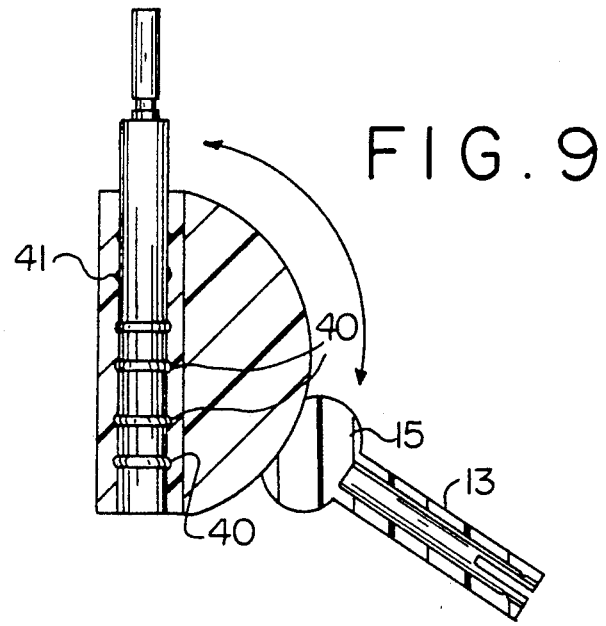

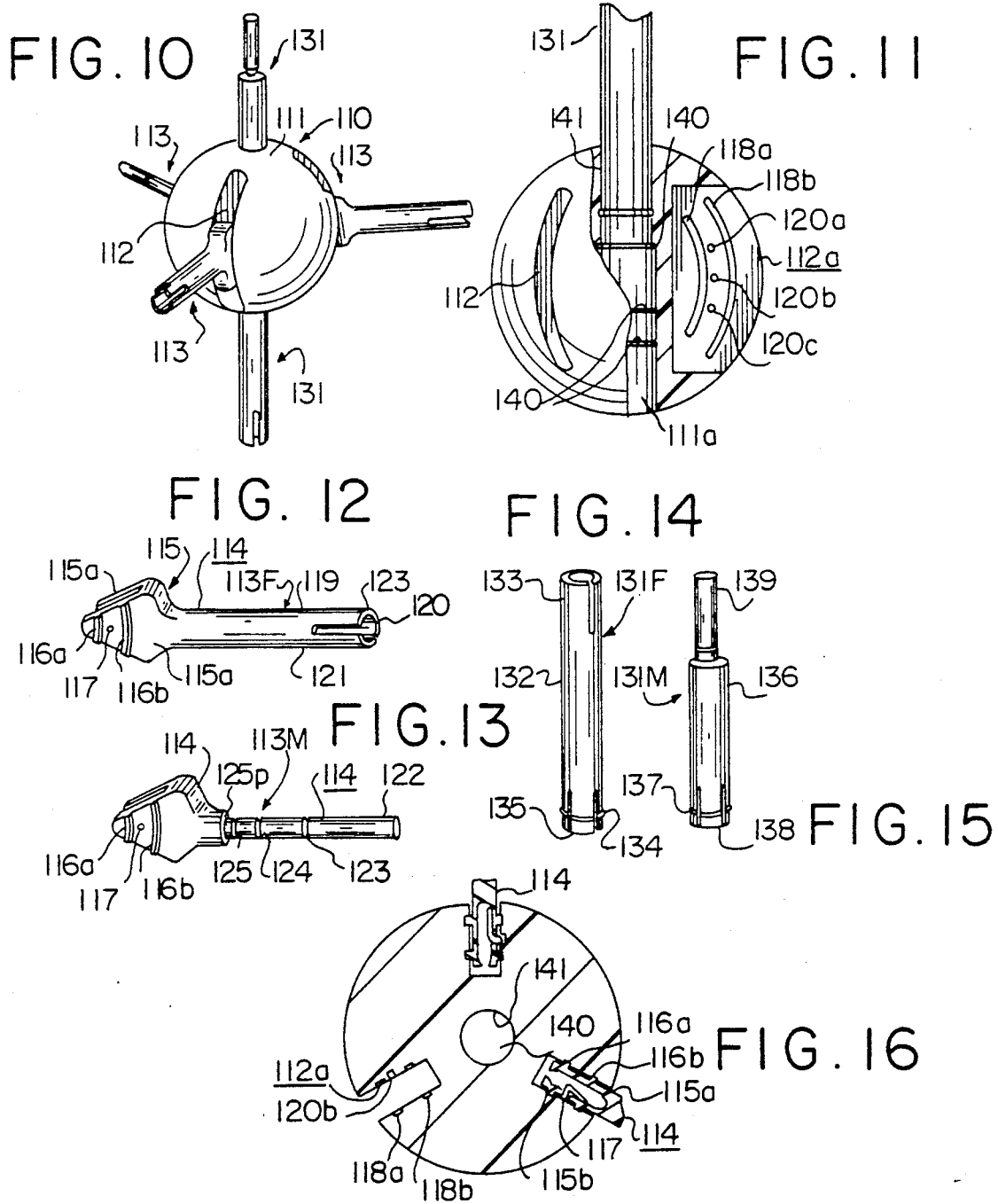

DYNAMIC MOLECULAR MODEL

BACKGROUND OF THE INVENTION (i) Field of the Invention

The present invention relates generally to models used for representing atoms and molecules, and in particular to a novel and improved model of this type including provision for dynamic representation of molecular and atomic orbitals.

(ii) Description of the Prior Art

Many patents are directed to such molecular models. For example U.S. Pat. No. 2,974,425, patented March 1961, by Dreiding, included a large number of different model building components. Since the components were formed from machined steel they were inflexible and thus models of certain molecules and compounds could not be constructed therefrom. In addition, inasmuch as machined steel was utilized, the overall cost of the set was quite high and could not be afforded by students and the like.

U.S. Pat. No. 3,080,662, patented Mar. 2, 1963, by Bramlik, proposed to provide a chemical model which was capable of representing the volume orbitals and of demonstrating their spatial arrangement and interactions so as to exemplify the important role which they played in chemical reactions. The patentee also proposed to provide a chemical model which was capable of representing the greatest number of molecules, radicals and ions with the smallest number of different piece-types, so as to minimize the cost of a model set of any given size. By means of his inventive concept, the patentee proposed to provide a model assembly for representing the atomic and molecular orbital structure of atoms in a molecule. The assembly included at least one body representing the atom core, at least one body shaped to represent the three dimensional character of an atomic orbital, and means for selectively connecting the bodies the depict an atom having at least on unshared electron pair orbital.

Canadian Patent No. 712,758, patented July 6, 1965, by Bramlik, proposed to provide a molecular model assembly which comprised a plurality of coupling units each represented the center and the directed valence orbitals of a single atom. Each had arm sections angularly arranged in accordance with the symmetry axes of valence orbitals and bond angles of the atom to be depicted by the coupling unit. A plurality of elongated cylindrical sections were provided, each being sized for frictional-mounting at each end on respective arm sections of the coupling units. The cylindrical sections were respectively sized to represent accurately to scale the sigma bond distances between bonded atoms represented by the coupling units, and the Van der Waal's radii of unshared electron pair orbitals, pi orbitals and polynuclear pi orbitals. The cylindrical sections were colour-coded respectively to depict atoms of selected elements. The coupling units and cylindrical sections were thus capable of being coupled to form an accurate frame work model of a selected molecule including accurate scale representations of bond angles, bond distances, covalent radii, and Van der Waal's radii.

U.S. Pat. No. 3,230,643, patented January 1966, by Mathus, provided a combination of plastic parts for the atoms and metal tubing for the bonds. This set required the gluing of the plastic parts which comprised the atoms. Since the bonds were represented by metal tubing, the resulting molecular model members were relatively inflexible which resulted in the fracturing of these members across the glue line when the metal tubing was stressed. In addition, because of this inflexibility, the models of a number of different organic molecules and compounds, such as those requiring less than a five member ring, could not be formed.

U.S. Pat. No. 3,333,349, patented Aug. 1, 1967, by Bramlik, provided a large number of different components and utilized tubing to connect such components. Since the user had to cut the tubing for his own needs, it was very possible that incorrect lengths would be cut which would result in the formation of a model of a molecule or compound with an incorrect spatial relationship between the atoms. In this case, dimensional accuracy between atoms would not exist and the resulting molecule or compound may have been impossible of actual existence.

U.S. Pat. No. 3,510,962, patented May 12, 1970, by Sato, attempted to solve two problems. The first problem to be met consisted of how to orient the various bond angles of the model to represent the actual bond angles of the molecules. The second problem resided in the connections between the spherical and polyhedral ball members and the bond members. A tight but rotatable telescopic engagement of these members was required. The patentee provided a molecular structure educational model for use in teaching stereo-chemistry comprising polyhedral block members each having fourteen facets and a cubic configuration with eight corners cut away along the straight lines connecting the centres of the adjacent ones of the twelve edges forming six square facets and eight equilateral triangular facets. Every pair of opposite facets of each polyhedral block member was parallel to each other, and each of the facets had a hole in the center thereof perpendicular to the plane of the facet. Rod members were insertable in the holes to interconnect the polyhedral block members.

Canadian Patent No. 871,230, patented May 18, 1971, by Bramlik, proposed to provide molecular orbital models by means of a model assembly for representing the atomic and molecular orbital structure of atoms in a molecule. The assembly comprised a plurality of units which represented atom cores, each of the units comprised a solid body having the form of a polyhedron with triangular planar faces and with a bore at each corner thereof arranged in accordance with the symmetry axes of the valence orbitals and bond angles of the atom to be depicted by the unit, the bodies of the plurality of atom core units were of three types respectively defining a tetrahedron, a trigonal bipyramid and an octahedron depicting the forms of the hybridization states of a single atom. A plurality of such units represented atomic orbital lobes and each comprises a hollow body of substantially ellipsoid-shape which had a terminal bore. Coupling means were provided in the form of elongated members which had end portions sized for frictional-mounting within the bores of the atom core units and orbital lobe units for interconnecting selected atom core units and for connecting selected orbital lobe units to the atom core units to form semi-skeletal models of selected molecules including scale representations of bond angles, bond distances, atomic orbitals and inter-nuclear distances, with the molecules shown in ground states and excited states.

Canadian Patent No. 907,320, patented Aug. 15, 1972, by Forsstrom, attempted to provide a construction series for molecular models which comprised, in combination, a first unit in the form of a spherical segment which had a spherical surface of a size substantially greater than a semi-sphere, and which had a flat surface formed with a recess on the flat surface for receiving a portion of a spherical surface of another unit. An interengageable member, extended from the bottom of the recess centrally of the recess and approximately to the flat surface. The spherical surface of the first unit was formed with at least one aperture which had a cross-section corresponding to that of the cross-section of the interengageable member. Two units could thus be joined by inserting the interengageable member of the first unit into an aperture of the other unit.

Canadian patent No. 949,311, patented June 18, 1974, by Nicholson, proposed to provide a model representing a molecular structure which comprised atoms and interatomic bonds. A unit, which represented a multivalent, atom comprised a spherical body which had a single socket which comprised a cylindrical hole of circular cross-section diametrically-extending of the body with a depth greater than the radius of the body and a plurality of integral arms radiating from the body. Each of the atoms had a portion of polygonal cross-section at the sphere and the number of arms was one less than the valence number of the atom represented. The socket and the arms were oriented relative to one another at substantially the correct valency angles of the atom, each arm had, at its free end, a cylindrical portion of a diameter tightly to fit into a like socket of another unit of the model and a length at least as great as the depth of the socket. In this way, a plurality of units were assembled with an integral arm of one unit fitting into the socket of another unit without play to form a substantially-rigid structure.

U.S. Pat. No. 4,020,656, patented May 3, 1977, by Dreiding, proposed to provide a set of structural elements for forming stereo-chemical models of molecular bonds between polyvalent atoms. Each structural element had at least two connector arms representing the valences of at least one atom. Each of the connector arms had opposite inner and outer and portions and were coupled at its inner end portion with a corresponding end portion of at least one other of the connector arms of the same structural element. The outer of each connector arm comprised manually-operably means for pair-wise equiaxial coupling and uncoupling the arm to or from a corresponding outer end portion of another connector arm of the same structural element or of another one of the structural elements. The means for pair-wise coupling and uncoupling the outer end portions of the connector arms comprised identically-designed coupling devices at each outer end portion of all connector arms. The coupling devices were configured for direct coupling of any two outer end portion of all connector arms without auxiliary means, the connector arms each comprised a flexible element which was normally rectilinear when unloaded.

Canadian Patent No. 1,147,143, patented May 31, 1983, by LeBlanc, attempted to provide a model assembly which comprised two spaced spheres which represented carbon atoms. Each sphere carried a fixed blade extending toward the other sphere with the fixed blades representing a hybridized "$sp^2$" orbital, and each sphere carried a blade representing an unhydbridized "p"" orbital movable in a first plane toward the other sphere to at least partially overlap or contact the corresponding blade carried by the other sphere which had been moved toward the first sphere in the first plane. Each sphere carried a pair of blades which each represented hybridized "$sp^2$" oribtals and which were simultaneously-movable in a second plane which was normal to the first plane. In each sphere the inner end of the blade which represented the hybridized "p" orbital was interconnected with the inner ends of the blades movable in the second plane which represented hybridized "$sp^2$" orbitals whereby movement of the unhybridized "p" orbital blade towards the other sphere resulted in simultaneous movement of the related pair of hybridized "$sp^2$" orbitals away from the other sphere to a position in the second plane where the three hybridized "$sp^2$" blades were separated by 120°.

U.S. Pat. No. 4,398,888, patented Aug. 16, 1983, by Darling et al., proposed to provide a molecular model building member which comprised a first end portion, a second end portion, and two arms connecting the first end portion and the second end portion, each of the two arms were substantially-symmetrical about its axis. The first end portion and the second end portion each had an opening formed therein to receive another molecular model building member to form a model of a molecule. Each of the first and second end portions had a projection formed thereon oppositely-directed from the opening formed therein. The opening was provided with inwardly-extending lips of the entrance thereto for engagement with the projection provided on another molecular model building member to interlock with the other molecular model building member when received within the opening adjacent the inwardly-extending lips.

Canadian Patent No. 1,179,497, patented Dec. 18, 1984, by Barrett, proposed to provide an interlocking molecular model system which comprised: a first component representative of an atom and which included at least one elongated shank outwardly-extending from a part of the component which represented the nucleus of the atom. The shank had a first cylindrical section of one cross-sectional area at its outer end, a second cylindrical section of smaller cross-sectional area adjacent the end of the first cylindrical section which faced the part of the component which represented the nucleus, the surface of the shank between the first and second cylindrical sections defined a shoulder inwardly-extending from the surface of the first cylindrical section, and an abutment extending transversely-outwardly relative to the axial direction of the second cylindrical section and adjacent to the end of the second cylindrical section closer to the part of the component which represented the nucleus. A fastener component was provided which comprised a hollow tubular position longitudinally-slotted at one end and had an axial length representative of a predetermined portion of a covalent radius of the atom, the inner surface at one end of the slotted end portion comprised an inwardly-extending axial lock which fit over the second cylindrical section of the first component to be hooked behind the shoulder on the shank and had an axial length substantially equal to the axial length of the second cylindrical section. The fastener component could thus be axially-interlocked with the shank so that the distance between the part of the first component which represented the nucleus and the remote end of the tubular portion of the fastener component was representative of the covalent radius of that atom, and the inner surface of the part of the tubular position between the axial lock and the remote end had a cross-sectional area large enough to fit over the first cylindrical section.

U.S. Pat. No. 4,325,698, patented Apr. 28, 1987, by Darling et al., and its corresponding Canadian Patent No. 1,167,637, patented May 22, 1984, proposed to provide a molecular model building member which comprised a main portion with two arms connected to and emanating outwardly from the main portion. The member was formed of relatively flexible material which permitted the arms to be bendable relative to the main portion. One of the arms was comprised of a first section connected to the main portion and a second section connected to the first section so that the first section was interposed between the main portion and the second section. The second section of one of the arms had an annular rib around the periphery thereof and had a smaller cross-section than the first section so as to form a first annular shoulder at their intersection. The other of the arms had a bore therein to receive the second section of the one of the arms of another of the molecular model building members and to frictionally-engage the annular rib provided thereon.

SUMMARY OF THE INVENTION (1) Aims of the Invention

In spite of all these patents, there is still a need for the provision of a molecular model which can be used to demonstrate various torsional and configurational changes which commonly occur during chemical transformations. Thus, one can realistically simulate actual chemical processes using a "hands-on" model.

Among the aims of the invention are the provision of: molecular models, by being able to depict various types of molecular orbitals, to be capable of illustrating reactive sites present in the molecule; means for providing any desired rod angles for representing the respective bond angles in a particular molecular or crystal educational model structure; means for affording efficient telescopic interengagement between the essential components thereof; molecular orbital models having a construction which outlines the orientation of the symmetry axes and the symmetry planes of atomic and molecular orbitals in three dimensions and illustrates, on a relative scale, the extent to which these orbitals reach out into molecular space; a molecular model set consisting of inter-fitting components which are assembled to meet the requirements of accurate representation of the largest variety of molecules in all their possible detail, and yet to achieve this with only a few essential components; molecular orbital models in which the molecular could be shown not only in the static state, but in an excited state, and in which the relative motions of atoms within a molecular could be depicted; a construction series for molecular models of the type in which the interatomic distance is substantially-correct in relation to the diameters of the atoms; molecular models for the purpose of teaching chemical bonding which would allow students to visualize the dynamics of olefinic bond formation, and to consider the planarity of the molecule; molecular models in which the components would be capable of being inexpensively-produced and easily-assembled, giving accurate representations of the internuclear distances and version angles, and representing Van der Waal's radii for outer atoms gave a good representation of the geometry that existed in the actual molecule; a molecular model system which comprised components that could be easily-assembled into a model of substantial complexity and which are sufficiently-interlocked to hold together firmly while permitting some parts of the model to rotate with respect to other parts; model components that could easily fit together in a minimum length of time and yet would result in molecular models of good accuracy; molecular model components of an interlocking-type that could be moulded of inexpensive plastic material so as to provide model sets that could be made available to students and others operating on restricted research budgets; low-priced molecular structure educational model sets through easy production techniques that permit the mass production of the elements of the models; and a low-cost molecular model building set that utilizes a minimum number of members that are dimensionally-accurate and which could be interconnected and/or interlocked to form models of organic molecules and compounds.

The present invention proposes to provide molecular models having three principal innovations, namely: (1) the ability to demonstrate the change in geometry as a tetrahedral array is converted to a trigonal bipyramidal or trigonal planar array and vice versa; (2) the ability to demonstrate the loss of torsional freedom as a consequence of converting a single bond to a double bond and the gain of torsional freedom upon changing a double bond to a single bond; and (3) the ability to demonstrate the change in interatomic distance as a consequence of converting a single bond to a double bond and vice versa.

(ii) Statement of Invention

The present invention provides a model assembly for representing the structure of a molecule, such assembly comprising: (a) a three-dimensional body providing a physical representation of an atomic core; (b) a first cylindrical hole extending inwardly along a central longitudinal axis of such three-dimensional body from each end of such three-dimensional body; (c) a plurality of connecting guiding elements disposed equiangularly about the periphery of the three-dimensional body; (d) an arm projecting outwardly from each such connecting guiding element, such arm being connected to an associated such connecting guiding element by a suitable mechanism so as to be arcuately-movable relative to its associated connecting guiding element only along a predetermined plane coincident with the plane of the associated connecting guiding element; (e) a second cylindrical hole extending inwardly along the central longitudinal axis of each of such arms from the distal end thereof; (f) a plurality of axial connectors adapted to be inserted into selected ones of the first cylindrical holes; and (g) said arms being adapted to be engaged into selected ones of the second cylindrical holes of another three-dimensional body.

This invention in one preferred embodiment also provides a model assembly comprising: (a) a cylinder providing a physical representation of an atomic core; (b) a first cylindrical hole extending inwardly along a central longitudinal axis of the cylinder from each end thereof; (c) connecting guiding elements in the form of three arcuate lobes disposed equiangularly about the periphery of the cylinder; (d) an arm projecting outwardly from each such arcuate lobe, each such arm being connected to an associated such connecting guiding element by a suitable mechanism so as to be arcuately-movable relative to its associated arcuate lobe only along a single predetermined plane coincident with the plane of such arcuate lobe; (e) a second cylindrical hole extending inwardly along the central longitudinal axis of each of the arms from the distal end thereof; (f) a plurality of axial connectors adapted to be inserted into selected ones of the first cylindrical holes; and (g) said arms being adapted to be engaged into selected ones of the second cylindrical holes of another three-dimensional body.

This invention, in another preferred embodiment, also provides a model assembly for representing the structure of a molecule, such assembly comprising: (a) a solid sphere providing a physical representation of an atomic core; (b) a cylindrical bore extending inwardly along a central longitudinal axis of such solid sphere from each end thereof; (c) connecting guiding means in the form of a plurality of arcuate grooves disposed equiangularly about the periphery of such solid sphere; (d) an arm projecting outwardly from each such arcuate groove, such arm being connected to an associated such connecting guiding element by a suitable mechanism so as to be arcuately-movable relative to its associated arcuate groove only along a single predetermined plane coincident with the plane of such arcuate groove; (e) a cylindrical hole extending inwardly along the central longitudinal axis of each of such arms from the distal end thereof; (f) a plurality of axial connectors adapted to be inserted into selected ones of the first cylindrical holes; and (g) said arms being adapted to be engage into selected ones of the second cylindrical holes of another three-dimensional body.

(iii) Other Features of the Invention

In one embodiment, the physical representation of the atomic core is a hollow cylinder and the connecting guiding elements comprise a plurality, (preferably three), semi-circular solid lobes which are separated by an angle of 120° disposed about the hollow cylinder. Each lobe preferably bears two grooves on either side of the lobe body. In addition, in this embodiment, the outer edge of each lobe is horizontally-notched at three positions. The notches or indentations preferably consist of asymmetric V-shaped wedges. The three indentations are located on the outer circumference of the lobe as follows: the middle indentation lies in the horizontal plane which bisects the core into two equal halves; the top indentation is located at an angle of 19.45° above this horizontal plane; the bottom indentation is located at an angle of 19.45° below this horizontal plane. The core of the cylinder has an outer circumference and an inner circumference, and the cylinder is inscribed with a number of internal grooves around its inner circumference.

In this embodiment of the invention, the equatorial connectors are attached to the grooves of the lobe via a pincer-like mechanism. Each such equatorial connector rides the outer edge of its lobe and has three positive resting positions, and includes a narrow steel wire within the connector acting as a spring to fix the connector to selected one of such positive three positions. In this way a moderate amount of force is required to lift the wire out of an associated notch and thus to cause the connector to move between positions.

In another embodiment of this invention, the physical respresentation of the atomic core is a solid sphere provided with a central bore, and the connecting guiding elements comprise a plurality (preferably three), semi-cylindrical slots disposed equiangulerly about the solid sphere. Each slot has side walls, and the slot has two lateral grooves within the side walls to receive an equatorial connector. Each equatorial connector preferably includes a pair of spaced-apart V-shaped wedges, which fit into the semi-circular slot located as follows: the middle indentation lies in the horizontal plane which bisects the core into two equal halves; the top indentation is located at an angle of 19.45° above this horizontal plane; the bottom indentation is located at an angle of 19.45° below this horizontal plane. Each V-shaped wedge includes a pair of spaced-apart arcuate protrusions separated by a flexible pin. The pin is adapted selectively to fit into one of three angularly-spaced-apart indentations in one side wall of the semi-cylindrical slot located as follows: the middle indentation lies in the horizontal plane which bisects the core into two equal halves; the top indentation is located at an angle of 19.45° above this horizontal plane; the bottom indentation is located at an angle of 19.45° below this horizontal plane. At the resting position, the pin may fit into one of the above-described indentations. In the dynamic position, the pin does not fit into any of the indentations. In this embodiment as well, the internal wall of the central bore is described with a number of internal grooves around its internal circumference.

In each embodiment, the equatorial connector includes a tail, and the tail of the equatorial connector may be either in male form (in which the tail is a solid cylinder provided with a plurality of longitudinally-spaced-apart protrusions), or in female form (in which the tail is a hollow cylinder, having its end slitted to provide expansion slots).

The physical representation of an atomic core may include a combination of two male and one female equatorial connectors or a combination of one male and two female equatorial connectors.

In either of these two embodiments, the axial connectors may be in male or female form. The male form preferably comprises a hollow cylinder having a terminal ring protrusion provided with a slotted end to allow for compression, and a terminal solid cylindrical tail, while the female form preferably comprises a hollow cylinder having a terminal ring protrusion, and a terminal hollow slotted cylinder.

In either of these two embodiments, one end of the axial connector is insertable to various depths in the first cylindrical hole in the cylinder, or in the cylindrical base in the solid sphere respresenting the atomic core. The first cylindrical hole in the cylinder and the cylindrical bore in the solid sphere each include an inner circumference provided with a plurality of internal grooves, the connection with the cylinder or with the solid sphere being accomplished by a ring and groove mechanism the axial connector including an external ring, and in which the external ring of the axial connector rests in a selected one of the internal grooves in the inner circumference of the first cylindrical hole in the cylinder or in the cylindrical bore in the solid sphere or bore. The varying extent to which the axial connectors are allowed to protrude is governed by which of the selected internal groove in the first cylindrical hole in the cylinder or the cylindrical bore in the solid sphere has been selected.

In either of these two embodiments, the model assembly may include light-weight spheres representative of either hydrogen or halogen atoms, which are attachable either to the male or female ends of either the axial or equatorial connectors via a simple friction fitting. Such spheres preferaly are of different diameters representative of the different Van der Waal's radii of the atoms being represented.

BRIEF DESCRIPTION OF THE DRAWINGS

In the accompanying drawings:

FIG. 4 is a perspective view of a female equatorial connector forming part of the molecular model of the embodiment of FIG. 1;

FIG. 5 is a perspective view of a male equatorial connector forming part of the molecular model of the embodiment of FIG. 1;

FIG. 6 is a perspective view of a female axial connector forming part of the molecular model of the embodiment of FIG. 1;

FIG. 7 is a perspective view of a male axial connector forming part of the molecular model of the embodiment of FIG. 1;

FIG. 8 is a cross-sectional view of the connection between an equatorial connector and a lobe in the molecular model of the embodiment of FIG. 1;

FIG. 9 is a central longitudinal cross-section through the molecular model of the embodiment of FIG. 1;

FIG. 10 is a perspective view of a second embodiment of the molecular model of this invention;

FIG. 11 is a side elevational view, partially in section, of the core and lobes of the molecular model of the embodiment of FIG. 2;

FIG. 12 is a perspective view of a female equatorial connector forming part of the molecular model of the embodiment of FIG. 2;

FIG. 13 is a perspective view of a male equatorial connector forming part of the molecular model of the embodiment of FIG. 2;

FIG. 14 is a perspective view of a female axial connector forming part of the molecular model of the embodiment of FIG. 2;

FIG. 15 is a perspective view of a male axial connector forming part of the molecular model of the embodiment of FIG. 2; and FIG. 16 is a transverse sectional view of the embodiment of molecular model of FIG. 2.

DESCRIPTION OF PREFERRED EMBODIMENTS (i) Description of FIGS. 1–9

Figure 1:
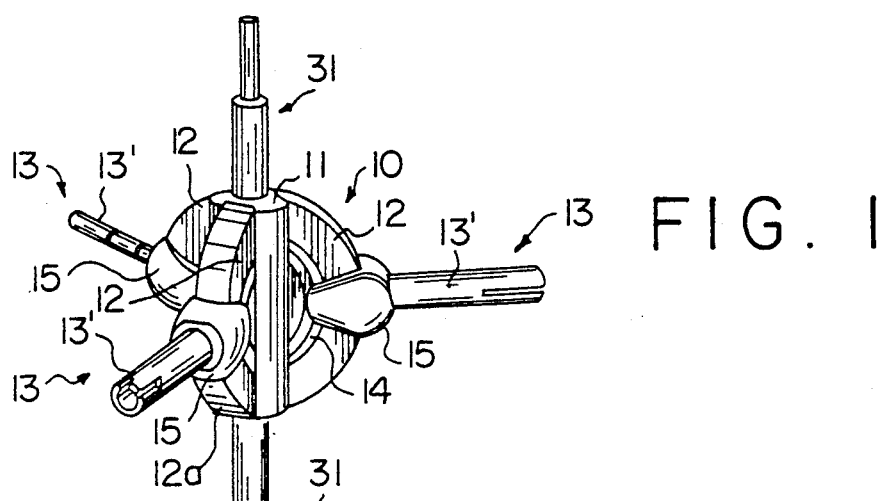
FIG. 1 is a perspective view of one embodiment of the molecular model of this invention.
Figure 2:
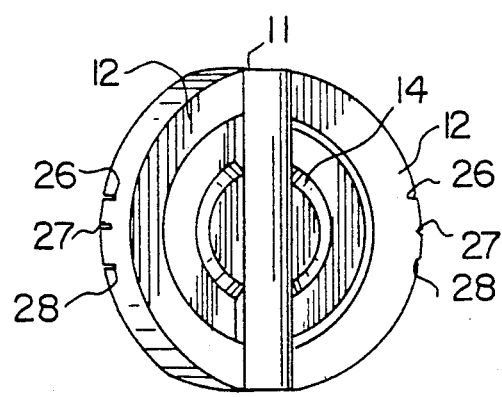
FIG. 2 is a side elevational view of the core and lobes of the embodiment of molecular model of FIG. 1.
Figure 3:
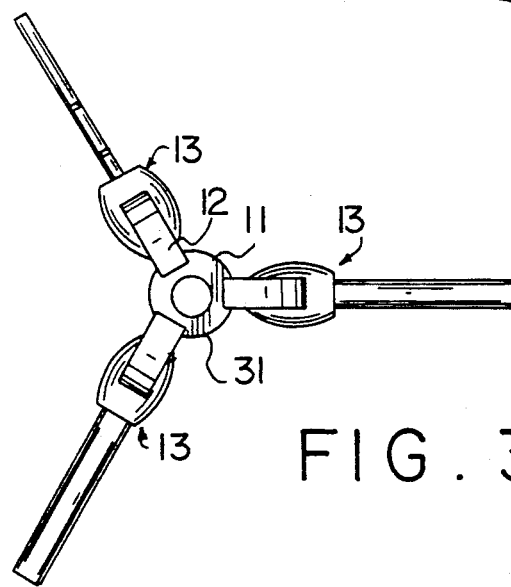
FIG. 3 is a top view of the embodiment of molecular model of FIG. 1.

As seen as FIGS. 1, 2 and 3, the physical representation of an atomic core element 10 includes a hollow upright cylindrical torso 11 provided with a plurality (in this case three) equiangularly- spaced-apart lobes 12. The core element 10 is primarily intended for the representation of carbon atoms, but other multivalent atoms, e.g., nitrogen, oxygen, phosphorus and sulfur can also be represented.

Three equatorial connectors 13 extend between respective core elements 10 to define arms 13', one for each lobe 12 permanently attached to semi-circular grooves 14 of the lobe 12 via a pincer-like mechanism 15. These connectors 13 are available in both male and female form. FIG. 4 shows a female equatorial connector 13F, while FIG. 5 shows a male connector 13M.

Both the female connector 13F and the male connector 13M include a main body 19, provided with two spaced-apart legs 15a, each leg terminating in an inwardly directed tow 16, which engages the forward wall 17 and the sloped rear wall 18 of the groove 14 (see FIG. 8). Projecting outwardly from the rear of the body of the female connector 13F is a hollow cylindrical barrel 19a. The open end 20 of hollow cylindrical barrel 19a is slotted at 21 to provide for expansion. Projecting outwardly from the rear of the body 19 of the male connector 13M is a solid rod 22 provided with three spaced-apart, ring-like grooves 23, 24 and 25.

Each physical representation of the atomic core 10 will have either a combination of two male equatorial connectors 13M and one female equatorial connector 13F or a combination of two female equatorial connectors 13F and one male equatorial connector 13M. However, FIGS. 1 and 3 show two female equatorial connectors 13F and a male equatorial connector 13M.

An equatorial connector 13 rides along the outer edge 12a of its lobe 12 and has three positive resting positions as determined by the indentations 26, 27, 28 on its respective outer edge 12a of the lobe 12.

As seen in FIG. 8, a narrow steel wire 29 within the equatorial connector 13 acts as a spring to fix the equatorial connector 13 to the three above-noted positions. A moderate amount of force is required to lift the spring out of the notch 30 within the body 15 of the equatorial connector 13 and thus cause the equatorial connector 13 to move between the aforesaid positions.

FIGS. 6 and 7 show the axial connectors 31, namely the female axial connector 31F in FIG. 6 and the male axial connector 31M in FIG. 7. The female axial connector 31F is a hollow cylinder 32 provided at one end with a compression slot 33 and at the other end with a ring-like protrusion 34 as well as a compression slot 35.

The male axial connector 31M includes a hollow cylindrical barrel 36 provided at one end with a ring-like protuberance 37 and a compression slot 38, and at the other end with a solid cylindrical pin 39.

(ii) Description of FIGS. 10–16

As seen in FIGS. 10, 11 and 16, the physical representation of the atomic core element 110 of a second embodiment of this invention includes a solid sphere 111 including a cylindrical bore 111a, provided with a plurality (in this case three) equiangularly-spaced-apart arcuate slots 112. The physical representation of the atomic core element 110 is primarily intended for the representation of carbon atoms, but other multivalent atoms, e.g., nitrogen, oxygen, phosphorus and sulfur can also be represented.

Three equatorial connectors 113, one for each slot 112, are permanently-attached to slots 112 via a tongue and groove mechanism. These connectors 113 are available in both male and female form. FIG. 12 shows a female equatorial connector 113F, while FIG. 13 shows a male connector 113M.

Both the female connector 113F and the male connector 113M include a main body 114, provided with a yoke 115 constituted by two spaced-apart legs 115a. Each leg 115a includes a pair of spaced-apart, arcuate ridges 116a, 116b and, between such ridges, a flexible pin 117. Projecting outwardly from the rear of the body of the female connector 113F is a hollow cylindrical barrel 119. The open end 120 of barrel 119 is slotted at 121 to provide for expansion. Projecting outwardly from the rear of the body 114 of the male connector 113M is a solid rod 122 provided with three spaced-apart, ring-like grooves 123, 124 and 125.

Each physical representation of an atomic core 110 will have either a combination of two male equatorial connectors 113M and one female equatorial connector 113F or a combination of one male equatorial connector 113M and two female equatorial connectors 113F. However, FIG. 10 shows two female equatorial connectors 113F and one male equatorial connector 113M.

Each equatorial connector 113 is connected to its appropriate slot 112 in the following manner. Two spaced-apart grooves 118a and 118b are cut into both of the internal walls 112a of each slot 112 (see FIG. 11). The yoke 115 of the body 114 of the equatorial connector 113 is compressed slightly to fit into the slot 112. The legs 115a, 115b then spring apart and the arcuate ridges 116a and 116b fit into the grooves 118a and 118b respectively. The flexible pin 117 fits into one of three indentations 120a, 120b and 120c in the wall 112a of the slot 112. These indentations serve to lock the equatorial connector 113 into place in any one of three positions.

FIGS. 14 and 15 show the axial connectors 131, namely the female axial connector 131F in FIG. 6 and the male axial connector 131M in FIG. 7. The female axial connector 131F is a hollow cylinder 132 provided at one end with a compression slot 133 and at the other end with a ring-like protrusion 134 as well as a compression slot 135.

The male axial connector 131M includes a hollow cylindrical portion 136 provided at one end with a ring-like protuberance 137 and a compression slot 138, and at the other end with a solid cylindrical pin 139.

OPERATION OF PREFERRED EMBODIMENTS (i) Operation of First Embodiment

Referring to FIGS. 1-9, it is noted that the primary purpose of the equatorial connectors 13 previously described is to connect to physical representation of the atomic cores 10 so as to form the so-called carbon "skeleton" of a typical organic molecule, e.g., —C—C—C—C—C—. The carbon-carbon bonds are made by inserting a male connector 13M into the barrel 19a of the female connector 13F to define an arm 13. This achieved in the following manner: The three grooves 23, 24, 25 on the male connector 13M define three possible internuclear distances. When the male-female connection is made to give the longest internuclear distance corresponding to that of a single bond, free rotation is allowed by the ring and groove connection. However, when the barrel 19 of the female connector 13F is pushed along the male cylinder 13M until the shortest internuclear distance is achieved, free rotation is prevented by a "slotting mechanism", i.e., a small protrusion 25P on the cylinder 22 of the male connector 13M which fits into a cooperative slot 21S in the barrel 19a of the female connector 13F. This slotting mechanism also automatically aligns the two atomic cores so that their axial cylinders are parallel. The intermediate position is for use in conjugated dienes, i.e., where free rotation is permitted. Thus, connection can be made to form three types of carbon-carbon bonds with three separate internuclear distances which correspond to a single bond, a partial double bond and a double bond. This same mechanism can be used to represent heteroatom-carbon or heteroatom-heteroatom single bonds and double bonds.

The primary function of the axial connector 21 is to allow for functional modification of the carbon skeleton, e.g., the ionization of an alkyl halide, inversion at a tetrahedral carbon, protonation of a double bond, etc. In this way, reaction at a single carbon atom in a complex structure can be modified without disturbing the entire structural backbone.

The connection of the axial connectors 31 to the atomic core 10 is accomplished by inserting one end of the axial connector 31 to various depths in the central core of cylinder 11 of the physical representation of the atomic core 10. This connection is accomplished by a ring and groove mechanism in which the external ring 34, 37 of the axial connector 31 rests in a respective one of three internal grooves 40 within the internal wall 41 of the central core of cylinder 11 of the physical representation of the atomic core 10 (see FIG. 9). The slots 35, 38 at one end of the axial connector 31 allow for compression as the axial connector 31 is inserted into the cylindrical core 11.

A secondary function of these axial connectors is to allow for extension of the carbon skeleton along the axial directions, as for example, in Diels-Alder reactions or Aldol condensations. For this purpose, the axial connectors 31 are, as noted above in both male and female form and the connecting mechanism is similar to that outlined above for the equatorial connection, except that only a single bond distance is provided for. It is important to note that the equatorial method of connecting atomic cores results in a much stronger carbon skeleton, since only one ring and groove connection is required to join any two cores. The axial connection requires a total of three ring and groove interactions and thus this method of connection is to be used only when demonstrating axial carbon-carbon bond formation.

The varying extent to which the axial connectors are allowed to protrude is governed by which internal groove in the atomic core has been selected. These options, when exercised in combination with the options available for the positions of the three equatorial connectors, allow one to interconvert a variety of structural features commonly found in organic molecules.

In addition to these essential elements, optional elements include univalent spheres. These light-weight hollow spheres represent either hydrogen or halogen atoms and can be attached to either the male or female ends of either the axial or equatorial connectors via a simple friction fitting. Different diameters of the spheres would reflect the different Van der Waal's radii of the atoms being represented. Use of the hydrogen spheres is optional in the construction of the more complex organic molecules.

(ii) Operation of Second Embodiment

Referring to FIGS. 10-16, it is noted that the primary purpose of the equatorial connectors 113 previously described for this embodiment of the invention is the same as for the first embodiment of the invention, namely they are to connect physical representation of an atomic core 110 so as to form the so-called carbon "skeleton" of a typical organic molecule, e.g., —C—C—C—C—C. The carbon-carbon bonds are made by inserting a male connector 113M into the barrel of the female connector 113F. This achieved in the following manner; The three grooves 123, 124, 125 on the male connector 113M define three possible internuclear distances. When the male-female connection is made to give the longest internuclear distance corresponding to that of a single bond, free rotation is allowed by the ring and groove connection. However, when the barrel 119 of the female connector 113F is pushed along the male cylinder 113M until the shortest internuclear distance is achieved, free rotation is prevented by a "slotting mechanism", i.e., a small protrusion 125P on the cylinder 122 of the male connector 13M which fits into a cooperative slot 121S and in the barrel 119 on the female connector 113F. This slotting mechanism also automatically aligns the two atomic cores so that their axial cylinders are parallel. The intermediate position is for use in conjugated dienes, i.e., where free rotation is permitted. Thus, connection can be made to form three types of carbon-carbon bonds with three separate internuclear distances which correspond to a single bond, a partial double bond and a double bond. This same mechanism can be used to represent heteroatom-carbon or heteroatom-heteroatom single bonds and double bonds.

The primary function of the axial connector 121 is to allow for functional modification of the carbon skeleton, e.g., the ionization of an alkyl halide, inversion at a tetrahedral carbon, protonation of a double bond, etc. In this way, reaction at a single carbon atom in a complex structure can be modified without disturbing the entire structural backbone.

The connection of the axial connectors 131 to the atomic core 110 for this embodiment of the invention is the same as for the first embodiment of the invention, namely they are accomplished by inserting one end of the axial connector 131 to various depths in the central hollow core 111a of the physical representation of an atomic core 110. This connection is accomplished by a ring and groove mechanism in which the external ring 134, 137 of the axial connector 131 rests in one of three internal grooves 140 in the interior wall 141 of the cylindrical bore 111 of the core 110. The slots 135 and 138 at one end of the axial connector 131 allow for compression as the connector 131 is inserted into the cylindrical bore 111.

A secondary function of these connectors for this embodiment of the invention is the same as for the first embodiment of the invention, namely is to allow for extension of the carbon skeleton along the axial directions, as for example, in Diels-alder reactions or Aldol condensations. For this purpose, the connectors come in both male and female form and the connecting mechanism is similar to that outlined above for the equatorial connection, except that only a single bond distance is provided for. It is important to note that the equatorial method of connecting atomic cores results in a much stronger carbon skeleton, since only one ring and groove connection is required to join any two cores. The axial connection requires a total of three ring and groove interactions and thus this method of connection is to be used only when demonstrating axial carbon-carbon bond formation.

The varying extent to which the axial connectors are allowed to protrude is governed by which internal groove in the atomic core has been selected. These options, when exercised in combination with the options available for the positions of the three equatorial connectors, allow one to interconvert a variety of structural features commonly found in organic molecules.

In addition to the essential elements described above, optional elements include univalent spheres. These light-weight hollow spheres represent either hydrogen or halogen atoms and can be attached to either the male or female ends of either the axial or equatorial connectors via a simple friction fitting. Different diameters of the spheres would reflect the different Van der Wall's radii of the atoms being represented. Use of the hydrogen spheres is optional in the construction of the more complex organic molecules.

ADDITIONAL UTILITY OF THE INVENTION

Thus, the present invention forms the basis of a molecular model set which allows one to represent accurately chemical transformations which involve a change in geometry from tetrahedral to trigonal bipyramid or trigonal plane and vice versa. This constitutes a substantial advance in mechanical molecular modelling. Thus, for example, one can carry out the hydrochlorination of a double bond and accurately demonstrate not only the change in geometry around each carbon atom, but also the change in bond distance and concomitant change in torsional freedom.

In addition, simple modifications of the atomic core would allow one to demonstrate triple bond and allene chemistry as well as the chemistry of three and four membered rings.

The dynamic model of aspects of this invention is able to demonstrate the change in molecular geometries as predicted by chemical theory. Some of the more elementary possibilities include, but in no means are limited to the following:

(1) Electrophilic addition to an olefin

Two trigonal planar carbons are converted in two steps to two tetrahedral carbons with concomitant lengthening of the carbon-carbon bond and concomitant gain in torsional freedom between the two carbons. Here is a detailed description of how a student would carry out this reaction:

The electrophile (a sphere) is added to one of the axial connectors representing a p-orbital on an olefinic carbon.

The three equatorial connectors on that carbon are placed in the appropriate locations so as to form a tetrahedral carbon.

The intercarbon bond is lengthened.

The two axial connectors (p-orbital) on the adjacent carbon are removed so as to represent a trigonal planar carbocation.

A nucleophile (a sphere bearing an axial connector) is inserted into this carbocation into either end of the axial cylinder.

Figure 17:
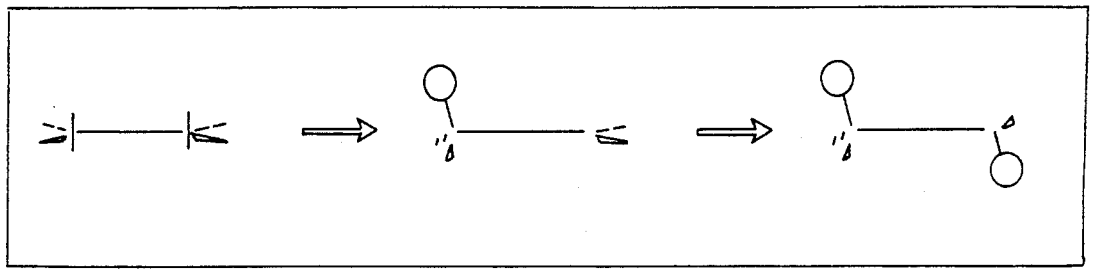
FIG. 17 is a schematic representation of an electrophilic addition to an olefin.

The three equatorial connectors are placed in their appropriate locations to form the second tetrahedral carbon. This is depicted in FIG. 17.

(2) Nucleophilic substitutions of alkyl halides

Variation one:

Racemate production ($S_N1$ mechanism): A tetrahedral carbon bearing a halide is ionized to yield a trigonal planar carbocation by removing the sphere representing the halide atom with its axial connector and by moving the three equatorial connectors from their tetrahedral to their trigonal planar positions.

A nucleophile can now attack the carbocation from either end of the vacant axial cylinder to yield a substituted tetrahedron once the equatorial ligands have been moved to their appropriate positions. If the alkyl halide was chiral (bearing four different substituents) the two possible products will be non-superposable mirror images (enantiomers).

Figure 18:
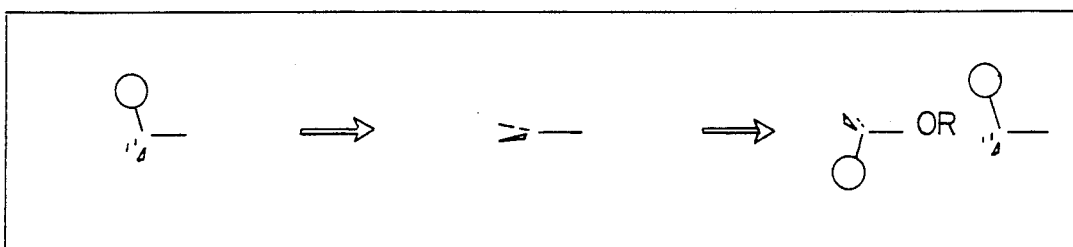
FIG. 18 is a schematic representation of racemate production ($S_N1$ mechanism) of a nucleophilic substitution of an alkyl halide.

A racemic mixture is produced. This is depicted in FIG. 18.

Figure 19:
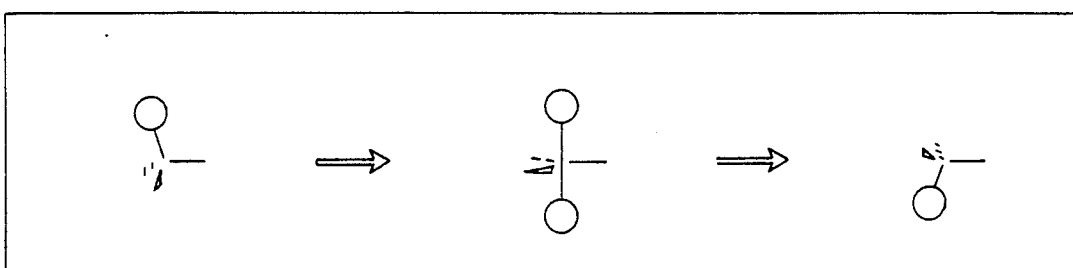
FIG. 19 is a schematic representation of a Walden inversion (($S_N2$ mechanism) of a nucleophilic substitution of an alkyl halide.

Variation two:

Walden inversion ($S_N2$ mechanism): A nucleophile approaches a tetrahedral carbon bearing a halide atom in the axial position and is inserted into the axial cylinder on the side opposite that occupied by the halide atom (sphere). The three equatorial connectors are moved into the trigonal planar positions. This carbon now bears 5 ligands in the so-called trigonal bipyramidal transition state. The halide is now expelled along with its axial connector and the equatorial ligands are placed in the appropriate positions to form a new tetrahedron. If the alkyl halide was chiral, it is said to have undergone a Walden inversion. This is depicted in FIG. 19.

(3) Nucleophilic addition to a carbonyl carbon assisted by protonation

A carbonyl carbon is constructed by attaching a trigonal planar carbon to a trigonal planar oxygen bearing two lone pairs as represented by two equatorial connectors.

A proton is attached to one of the red axial connectors as in the electrophilic attack of alkenes. The other axial connector is pushed into the body of the sphere so as to become invisible or removed if so desired. The oxygen atom is transformed into a freely-rotating tetrahedron by lengthening the carbon-oxygen bond and manipulating the two lone pair equatorial connectors. The two axial connectors are removed from the carbon to yield a carbocation.

Figure 20:
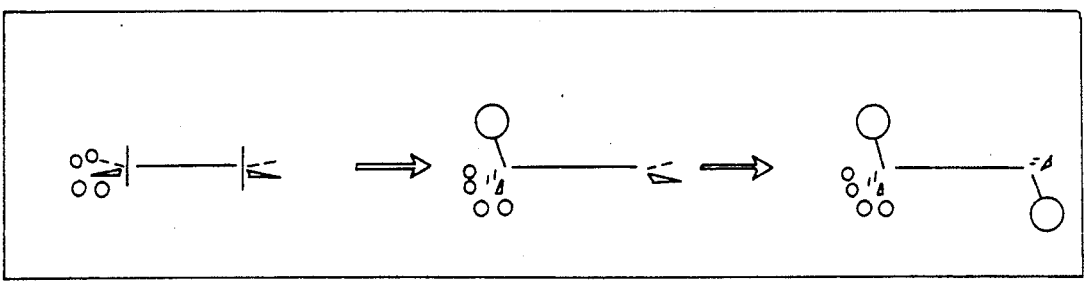
FIG. 20 is a schematic representation of a nucleophilic addition to a carbonyl carbon assisted by protonation.

The positive charge is quenched by an incoming nucleophile to form a tetrahedral carbon as in (1). This is depicted in FIG. 20.

(4) Enolization of a carbonyl carbon

Figure 21:
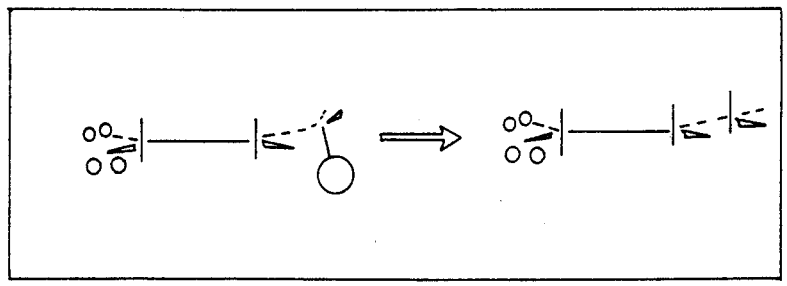
FIG. 21 is a schematic representation of an enolization of a carbonyl carbon.

A tetrahedral carbon flanking a carbonyl group is deprotonated along the axial direction and a double bond is formed between it and the carbonyl carbon by compressing the intercarbon bond. Free rotation is no longer possible. This new double bond can undergo electrophilic attach as in (1). This is depicted in FIG. 21.

(5) Inversion of ammonia or any pyramidal atom

Figure 22:
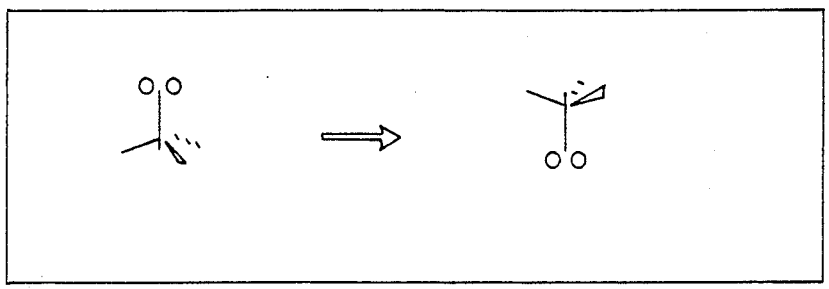
FIG. 22 is a schematic representation of the inversion of ammonia or any other pyramidal atom.

Ammonia can be represented by a tetrahedral array of three blue equatorially-connected ligands and a lone pair as represented by a specially long blue axial connector. Alternatively, two normal blue axial connectors which meet in the middle of the sphere can be used. The axial connector is pushed down into the body of the sphere and re-appears out the other side. The equatorial ligands are manipulated to create a new tetrahedron. The inversion of ammonia occurs rapidly at room temperature. This is depicted in FIG. 22.

(6) Photochemical cis-trans isomerization of an alkene

Figure 23:
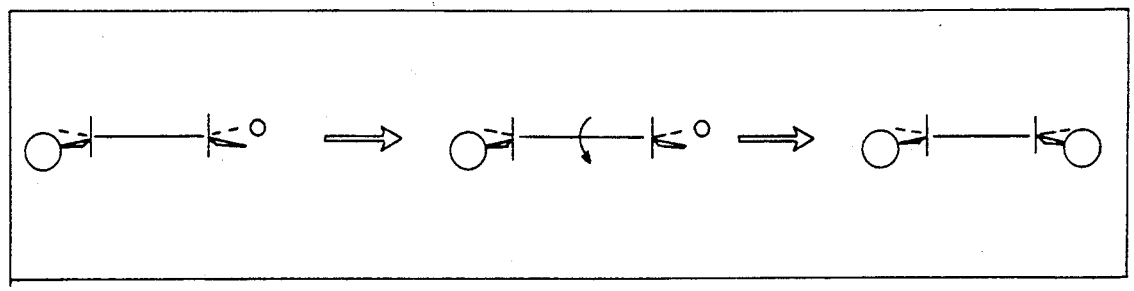
FIG. 23 is a schematic representation of the photochemical cis-trans isomerization of an alkene.

Two trigonal planar carbons are joined at the fixed double bond distance. A photon excites the double bond and causes the intercarbon bond to lengthen allowing a rotation of 180°. Double bond reformation occurs to give back an alkene. If the alkene is 1,2 disubstituted, a cis-isomer can be converted into a trans isomer in this manner. This motion forms the biochemical basis of vision. This is depicted in FIG. 23.

(7) Other geometries

These would require the construction of spheres with various arrays of ligands.

(a) Conversion of an alkyne to an alkene

Figure 24:
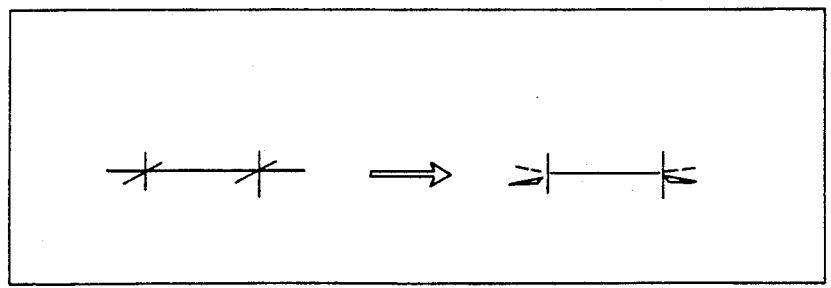
FIG. 24 is a schematic representation of the conversion of an alkyne to an alkene.

This would require the conversion of a carbon bearing two equatorial connectors situated at 180° from each other and two sets of orthogonal axial connectors into carbons bearing one set of axial connectors and three equatorial connectors situated at 120° from each other. An octahedral array is thus converted into a trigonal bipyramidal array. This is depicted in FIG. 24.

Figure 25:
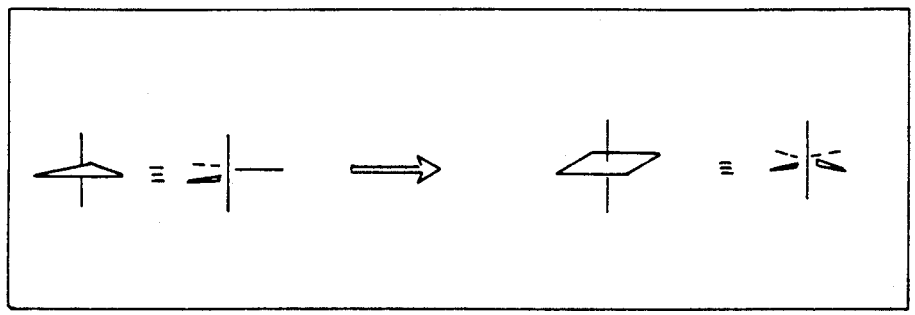
FIG. 25 is a schematic representation of the expansion of inorganic complexes from square planar to trigonal bypyramid and from trigonal bipyramid to octahedral.

(b) Expansion of inorganic complexes from square planar to trigonal bipyramid and from trigonal bipyramid to octahedral This is depicted in FIG. 25.

(c) Pseudorotation of trigonal bipyramidal inorganic complexes

Figure 26:
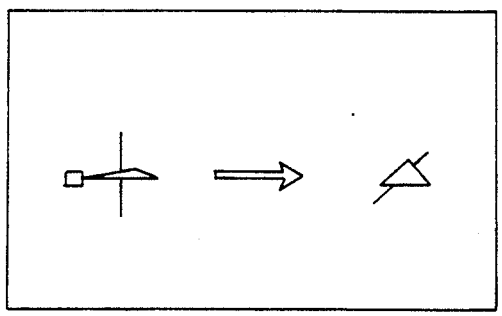
FIG. 26 is a schematic representation of the pseudorotation of trigonal bipyramidal inorganic complexes.

This is an extremely complicated motion to follow on paper. This is depicted in FIG. 26.

(d) Representation of cyclopropane/cyclobutane rings

Figure 27:
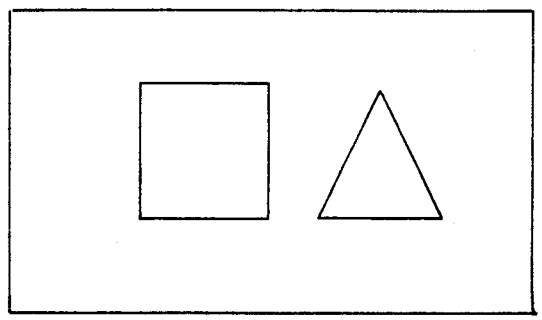
FIG. 27 is a schematic representation of cyclopropene/cyclobutene rings.

Three and four membered rings have internal angles well below tetrahedral. This is depicted in FIG. 27.

(e) Conversion of an allene to an olefin

Figure 28:
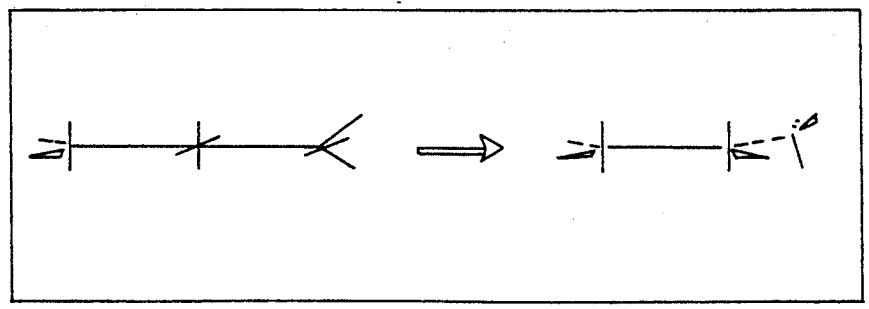
FIG. 28 is a schematic representation of the conversion of an allene to an olefin.

This is a variation on the alkyne/alkene conversion. This is depicted in FIG. 28.

(f) Conversion of trigonal planar graphite to tetrahedral diamond under pressure This could conceivably require no new structural element.

In conclusion these dynamic components could be combined with frozen tetrahedral carbons where no movement in the equatorial direction is permitted. This would bring to life the idea of a functional group conferring chemical reactivity to an otherwise inert hydrocarbon backbone. This concept lies at the heart of organic chemistry.

CONCLUSION

From the foregoing description, one skilled in the art can easily ascertain the essential characteristics of this invention, and without departing from the spirit and scope thereof, can make various changes and modifications of the invention to adapt it to various usages and conditions. Consequently, such changes and modifications are properly, equitably, and "intended" to be, within the full range of equivalence of the following claims.

We claim:

1. A model assembly for representing the structure of a molecule, such assembly comprising: (a) a three-dimensional body providing a physical representation of an atomic core; (b) a first cylindrical hole extending inwardly along a central longitudinal axis of said three-dimensional body from each end of said three-dimensional body; (c) a plurality of connecting guiding elements disposed equiangularly about the periphery of said three-dimensional body; (d) an arm projecting outwardly from each said connecting guiding element, said arm being connected to an associated said connecting guiding element by a suitable mechanism so as to be arcuately-movable relative to its associated connecting guiding element only along a single predetermined plane coincident with the plane of the associated connecting guiding element; (e) a second cylindrical hole extending inwardly along the central longitudinal axis of each of said arms from the distal end thereof; (f) a plurality of axial connectors adapted to be inserted into selected ones of said first cylindrical holes; and (g) said arms being adapted to be engaged into selected ones of said second cylindrical holes of another three-dimensional body.

2. A model assembly for representing the structure of a molecule, said assembly comprising: (a) a cylinder providing a physical representation of an atomic core; (b) a first cylindrical hole extending inwardly along a central longitudinal axis of said cylinder from each end thereof; (c) connecting guiding elements in the form of three arcuate lobes disposed equiangularly about the periphery of said cylinder; (d) an arm projecting outwardly from each said arcuate lobe, said arm being connected to an associated said connecting guiding element by a suitable mechanism so as to be arcuately-movable relative to its associated arcuate lobe only along a single predetermined plane coincident with the plane of said arcuate lobe; (e) a second cylindrical hole extending inwardly along the central longitudinal axis of each of said arms from the distal end thereof; (f) a plurality of axial connectors adapted to be inserted into selected ones of said first cylindrical holes; and (g) said arms being adapted to be engaged into selected ones of second cylindrical holes of another three-dimensional body.

3. A model assembly for representing the structure of a molecule, said assembly comprising: (a) a solid sphere providing a physical representation of an atomic core; (b) a cylindrical bore extending inwardly along a central longitudinal axis of said solid sphere from each end thereof; (c) connecting guiding means in the form of a plurality of arcuate grooves disposed equiangularly about the periphery of said solid sphere; (d) an arm projecting outwardly from each said arcuate groove, said arm being connected to an associated said connecting guiding element by a suitable mechanism so as to be arcuately-movable relative to its associated arcuate groove only along a single predetermined plane coincident with the plane of said arcuate groove; (e) a cylindrical hole extending inwardly along the central longitudinal axis of each of said arms from the distal end thereof; (f) a plurality of axial connectors adapted to be inserted into selected ones of said first cylindrical holes; and (g) said arms being adapted to be engaged into selected ones of said second cylindrical holes of another three-dimensional body 4. The model assembly of claim 2 wherein said physical representation of said atomic core comprises a hollow cylinder surrounded by three semi-circular solid lobes which are separated by an angle of 120°.

5. The model assembly of claim 4 wherein each said lobe bears two grooves on either side thereof.

6. The model assembly of claim 5 wherein the outer edge of each lobe is horizontally-notched at three positions.

7. The model assembly of claim 6 wherein said notches consist of asymmetric V-shaped wedges.

8. The model assembly of claim 7 wherein said indentations are located on the outer circumference of each lobe as follows: the middle indentation lies in the horizontal plane which bisects the core into two equal halves; the top indentation is located at an angle of 19.45° above this horizontal plane; and similarly, the bottom indentation is located at an angle of 19.45° below this horizontal plane.

9. The model assembly of claim 4 wherein said hollow cylinder which has an outer circumference and an inner circumference, is inscribed with a plurality of spaced-apart internal grooves around the inner circumference thereof.

10. The model assembly of claim 5 wherein said suitable mechanism are attached to the grooves of the lobe via a pincer-like mechanism.

11. The model assembly of claim 10 wherein each said suitable mechanism rides the outer edge of its lobe and has three positive resting positions, and including a narrow steel wire within said connector acting as a spring to fix the mechanism to selected one of said three positions, whereby a moderate amount of force is required to lift said wire out of an associated notch and thus to cause said connector to move between positions.

12. The model assembly of claim 3 wherein said atomic core comprises a solid sphere including three semi-circular slots therein which are separated by an angle of 120°.

13. The model assembly of claim 12 wherein each said semi-cylindrical slot has side walls, and wherein said slot has a pair of lateral grooves within said side walls to receive an equatorial connector.

14. The model assembly of claim 13 wherein each said suitable mechanism includes a pair of spaced-apart V-shaped wedges, which fit into an associated semi-circular slot, each V-shaped wedge including a pair of spaced-apart, arcuate protrusions separated by a flexible pin, each pin having adapted selectively to fit into an indentation in one side wall of said semi-cylindrical slot.

15. The model assembly of claim 14 wherein said indentations are located in said sidewall as follows: the middle indentation lies in the horizontal plane which bisects the core into two equal halves; the top indentation is located at an angle of 19.45° above this horizontal plane; and similarly, the bottom indentation is located at an angle of 19.45° below this horizontal plane.

16. The model assembly of claim 12 wherein said sphere includes a central bore, said central bore being inscribed with a plurality of internal grooves around the internal circumference thereof.

17. The model assembly of claim 10 wherein said arms may be in either male or female form.

18. The model assembly of claim 14 wherein said arms may be in either male or female form.

19. The model assembly of claim 17 wherein, said male form of said arm terminates in a tail defining is a solid cylinder provided with a plurality of longitudinally-spaced apart protrusions.

20. The model assembly of claim 18 wherein said male form of said, arms terminals in a tail, and wherein said tail is a solid cylinder provided with a plurality of longitudinally-spaced apart protrusions.

21. The model assembly of claim 17 wherein said female form of said arm terminates in a tail, and wherein said tail is a hollow cylinder, having its end slitted to provide expansion slots.

22. The model assembly of claim 18 wherein said female form of said arm terminates in a tail, and wherein said tail is a hollow cylinder, having its end slitted to provide expansion slots.

23. The model assembly of claim 17 wherein said atomic core has a combination of two male and one female arms.

24. The model assembly of claim 18 wherein said atomic core has a combination of two male and one female arms.

25. The model assembly of claim 17 wherein said atomic core has a combination of one male and two female arms.

26. The model assembly of claim 18 wherein said atomic core has a combination of one male and two female arms.

27. The model assembly of claim 19 wherein said male form possesses three grooves which define three possible internuclear distances.

28. The model assembly of claim 22 wherein said male form possesses three grooves which define three possible internuclear distances.

29. The model assembly of claim 21 wherein said female form is a hollow cylinder with a single internal ring, said cylinder being slotted to allow for expansion.

30. The model assembly of claim 22 wherein said female form is a hollow cylinder with a single internal ring, said cylinder being slotted to allow for expansion.

31. The model assembly of claim 10 wherein said axial connectors are in male or female form.

32. The model assembly of claim 14 wherein said axial connectors are in male or female form.

33. The model assembly of claim 31 wherein the male form of said axial connector comprise a hollow cylinder having a terminal ring protrusion and a slotted end to allow for compression, and a terminal solid cylindrical tail.

34. The model assembly of claim 32 wherein the male form of said axial connector comprise a hollow cylinder having a terminal ring protrusion and slotted end to allow for compression, and a terminal solid cylindrical tail.

35. The model assembly of claim 31 wherein the female form of said axial connector comprise a hollow cylinder having a terminal ring protrusion and a terminal hollow slotted cylinder.

36. The model assembly of claim 32 wherein the female form of said axial connector comprise a hollow cylinder having a terminal ring protrusion and a terminal hollow slotted cylinder.

37. The model assembly of claim 33 wherein one end of said axial connector is insertable to various depths in said first cylindrical hole in said cylinder representing said atomic core, said first cylindrical hole in said cylinder including an inner circumference provided with a plurality of internal grooves, said connection with said first cylindrical hole in said cylinder being accomplished by a ring and groove mechanism, said axial connector including an external ring, and wherein said external ring of said axial connector rests in a selected one of said internal grooves in the inner circumference of said first cylindrical hole in said cylinder, the varying extent to which said axial connectors are allowed to protrude being governed by which of said selected internal groove in said first cylindrical hole in said cylinder has been selected.

38. The model assembly of claim 34 wherein one end of said axial connector is insertable to various depths in said cylindrical bore in said solid sphere representing said atomic core, said cylindrical bore including an inner circumference provided with a plurality of internal grooves, said connection with said solid sphere being accomplished by a ring and groove mechanism, said axial connector including an external ring, and wherein said external ring of said axial connector rests in a selected one of said internal grooves in said cylindrical bore in said solid sphere, the varying extent to which said axial connectors are allowed to protrude being governed by which of said selected internal groove in said cylindrical bore in said solid sphere has been selected.

39. The model assembly of claim 35 wherein one end of said axial connector is insertable to various depths in said first cylindrical hole in said cylinder representing said atomic core, said first by cylindrical hole in said cylinder including an inner circumference provided with a plurality of internal grooves, said connection with said first cylindrical hole in said cylinder being accomplished by a ring and groove mechanism, said axial connector including an external ring, and wherein said external ring of said axial connector rests in a selected one of said internal grooves in said first cylindrical hole in said first cylindrical hole in said cylinder, the varying extent to which said axial connectors are allowed to protrude being governed by which of said selected internal groove in said first cylindrical hole in said cylinder has been selected.

40. The model assembly of claim 36 wherein one end of said axial connector is insertable to various depths in said cylindrical bore in said solid sphere representing said atomic core, said cylindrical bore including an inner circumference provided with a plurality of internal grooves, said connection with said solid sphere being accomplished by a ring and groove mechanism, said axial connector including an external ring, and wherein said external ring of said axial connector rests in a selected one of said internal grooves in said solid sphere in said cylindrical bore, the varying extent to which said axial connectors are allowed to protrude being governed by which of said selected internal groove in said cylindrical bore in said solid sphere has been selected.

* * * * *